Figure 3:
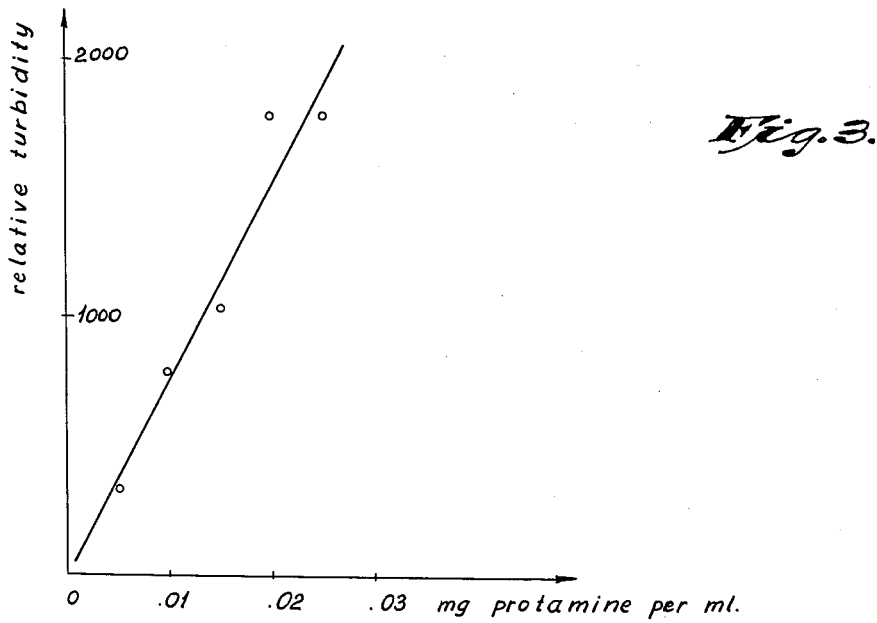

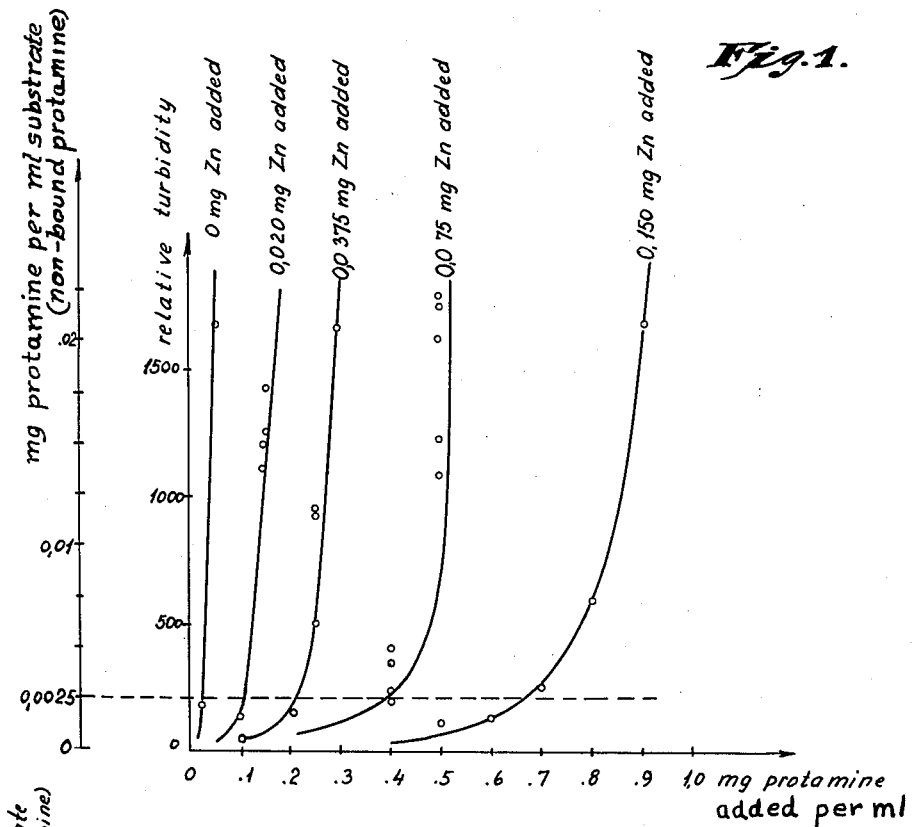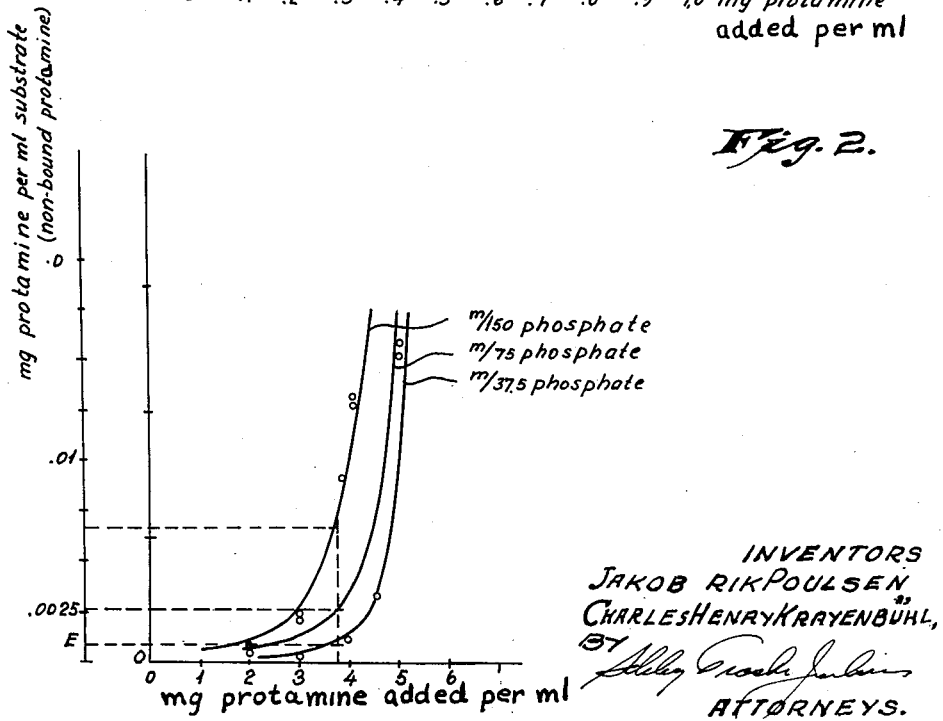

INVENTORS
JAKOB ERIK POULSEN
CHARLES HENRY KRAYENBÜHL,
BY
ATTORNEYS.

3,060,093
SLOWLY ACTING INSULIN PREPARATION IN CRYSTALLINE FORM AND METHOD OF PREPARATION
Jakob Erik Poulsen, Gentofte, and Charles Henry Krayenbühl, Hellerup, Denmark, assignors to Nordisk Insulinlaboratorium, Gentofte, Denmark
Filed July 15, 1958, Ser. No. 748,670
Claims priority, application Denmark July 18, 1957
7 Claims. (Cl. 167—75)

Numerous slowly acting insulin preparations are known. One of those most commonly used is zinc protamine insulin which is a suspension of particles consisting of protamine, insulin and zinc phosphate and has been entered in the U.S. Pharmacopoeia. Immediately after being prepared, the particles in this suspension are amorphous but after standing during a shorter or longer period of time a number of crystals of various sizes are formed in the amorphous suspension, said crystals being protamine insulin crystals probably corresponding to those formed by the method described in the specification to U.S. Patent No. 2,538,018. The products of this latter patent are less slowly acting than the aforesaid zinc protamine insulin.

The desire for being able to obtain a preparation having both a rapid and a slow action by mixing zinc protamine insulin with ordinary dissolved insulin has often been expressed. The product of U.S. Patent No. 2,538,018 offers this possibility, but for many cases it is not sufficiently slow-acting to be useful in such mixtures. The fulfillment in connection with zinc protamine insulin, however, meets with the difficulty that the insulin added is adsorbed to a high degree on the amorphous suspended particles, so that instead of the desired slow and rapid action, an action of medium slowness is obtained which commences later than would be the case if the two preparations were injected separately. A factor of uncertainty resides in that the adsorption decreases successively as the partial crystallization proceeds.

It would be an advantage for the described purpose as well as for use without the addition of ordinary dissolved insulin if it was possible to prepare a crystal suspension of zinc protamine insulin in such form that this zinc protamine insulin was completely crystalline and uniform from the beginning and the crystals were capable of retaining their size unchanged.

The present invention relates to insulin crystals having these properties and containing protamine and zinc. It has been found that the purpose can be achieved when the amount of protamine and zinc per 40 units insulin are, respectively, within the ranges 0.25–0.52 mg. of protamine and 0.030–0.085 mg. Zn.

Although the fulfillment of this requirement does not necessitate any definite ratio between protamine and zinc, it has been found that the best results are obtained when protamine and zinc are present in the crystals in a ratio between 3.67:1 and 5:1.

Further particulars as to the desirable composition of the crystals will appear from the following description and the appended claims.

The crystals are to be used for injection in the form of a suspension, and are produced in that form. Accordingly such suspensions are also subject matter of our invention. It has been found that for the achievement of the purpose of the invention the suspension medium should preferably contain phosphate buffer and crystals of the above-named composition suspended therein. Preferred particulars with respect to other aspects of the composition of our new crystal suspensions will likewise appear from the following specification and form subject matter of the appended claims.

With these objects and purposes in view we will now purport to describe first the preferred method by which our new product can be obtained.

The method consists in that zinc and protamine are added in the presence of phosphate buffer in such relative amounts to a suspension of crystals of protamine insulin that the suspension medium, with a certain desired approximation, is free of protamine and zinc after the reaction.

The reaction which takes place thereby consists in that the zinc and protamine added are taken up by the suspended protamine insulin crystals. The reaction takes place at room temperature and at pH-values about the neutral point, e.g. betwen 6 and 8, and requires no particular standing to be completed. It is of no consequence whether the protamine and the zinc are added in the form of a protamine salt and a zinc salt, respectively, or whether, for instance, they are added in the form of a previously precipitated suspension of zinc and protamine with phosphate buffer. In any case the protamine zinc phosphate will disappear from the suspension medium when the protamine and the zinc are brought together with the suspended protamine insulin crystals, provided that the relative amounts are the same as are required for obtaining preparations of a similar composition as the known zinc protamine insulin preparations. The same thing will occur by adding protamine, also when zinc is employed in amounts considerably exceeding the amount corresponding to the zinc contents in the known zinc protamine insulin preparations, e.g. in double amount, or by using zinc contents inferior to the known ones.

During the mixing step, the pH-value is kept inside the limits which are useful for crystallization of protamine insulin, viz. pH=6–8, but it is convenient that the final mixture is given a pH-value of 7.1–7.4. A suspension prepared in this way has been found to adsorb free insulin to a considerably smaller degree than the amorphous zinc protamine insulin would do, and by experiments on its keeping qualities at various temperatures no change of the crystal size has been observed. Experiments with animals as well as clinical tests have shown that the effect of the suspension is equal to the effect of ordinary (i.e. non-crystalline) zinc protamine insulin, at least when the zinc and protamine contents are the same (and that thus it is more highly protracted than are protamine insulin crystal suspension according to Patent No. 2,538,018), whereas mixtures with ordinary insulin exerts the rapid action of the dissolved insulin to a higher degree.

Suspensions prepared according to the present invention may also be mixed with suspensions of crystalline protamine insulin (Patent No. 2,538,118) whereby the mixture obtained when injected exerts the same action as if the two preparations were injected separately. Such mixtures may be desirable because the action of crystalline protamine insulin starts sooner and stops earlier than the action of the preparation made according to the present invention.

The action of preparations prepared according to the present invention and having a lower contents of zinc and protamine than the known zinc protamine insulin preparations, e.g. half thereof, is also unmistakably prolonged in comparison with the untreated suspension of protamine insulin crystals. In many cases such preparations may therefore advantageously be employed in the abovementioned mixtures.

As example, the composition of four different preparations prepared according to the invention is given in the table below. By microscopical examination these preparations have all been found to be completely crystalline and by biological tests to possess the abovementioned properties.

|  | A | B | C | D |
|---|---|---|---|---|
| Units of insulin per ml | 40 | 40 | 40 | 40 |
| mgs of Zn per ml.: | | | | |
| in initial crystals | 0.010 | 0.010 | 0.010 | 0.010 |
| added | 0.075 | 0.075 | 0.0375 | 0.020 |
| total | 0.085 | 0.085 | 0.0475 | 0.030 |
| total Zn as pct. of insulin | 5.10 | 5.10 | 2.85 | 1.80 |
| mgs of protamine per ml.: | | | | |
| in initial crystals | 0.15 | 0.15 | 0.15 | 0.15 |
| added | 0.375 | 0.25 | 0.19 | 0.10 |
| total | 0.52 | 0.40 | 0.34 | 0.25 |
| ratio of Zn to protamine added | 1:5 | 1:2.5 | 1:5 | 1:5 |

All of the experiments were carried out at room temperature.

The preparations B, C and D were prepared by adding an aqueous solution of zinc chloride and an aqueous solution of protamine sulfate to a suspension of crystalline protamine insulin. In the preparation A, zinc and protamine were added as one lot in the form of a suspension of protamine zinc phosphate formed by the addition of protamine salt and zinc salt to the suspension medium which contained phosphate buffer.

The pH-value during the admixture step was between 6 and 8 and the concentration of the suspension of protamine insulin crystals with respect to the insulin was so chosen that the number of units of insulin per ml. of the final product was stated in the table. Similarly, the concentration of phosphate buffer was so adjusted that the final preparations were 1/75 molar with respect to phosphate buffer but it is possible, as will appear from the following, to use phosphate concentrations which deviate considerably from the said ordinarily employed value, f. inst. having half or double the size thereof or more. The mixing procedure is carried out at room temperature in the case of all of the preparations. The table shows that the ratio of zinc and protamine added may be varied, as well as the amounts of zinc, relative to the amounts of insulin.

According to the invention, it is particularly suitable to employ the protamine in amounts which are up to five times the amount of zinc but not more. In that case the insulin added forms but a single precipitate with free protamine present in the suspension medium.

Figure 4:
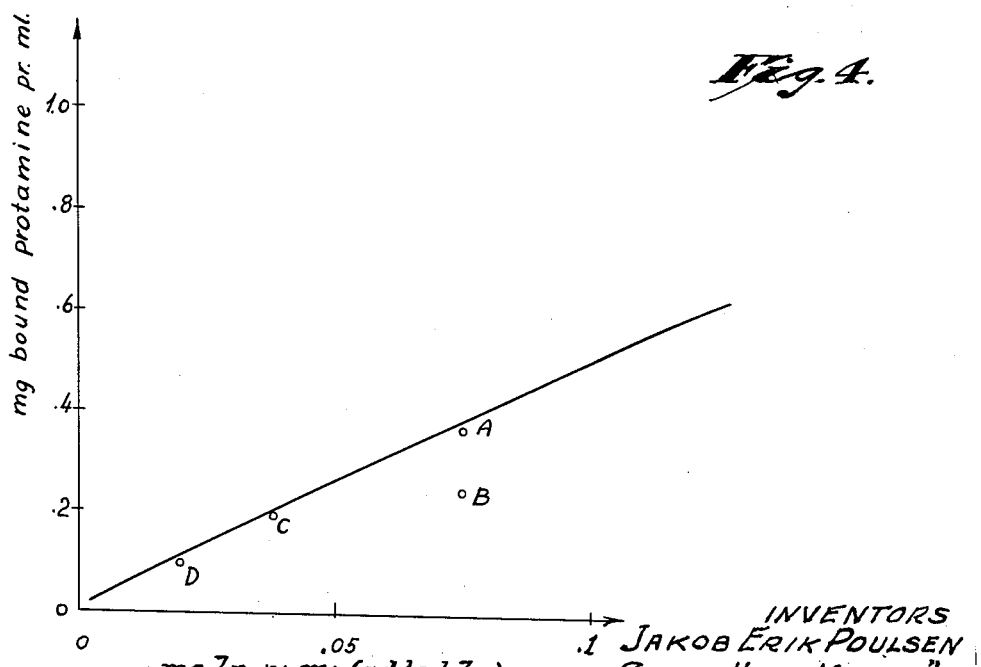
Figure 5:
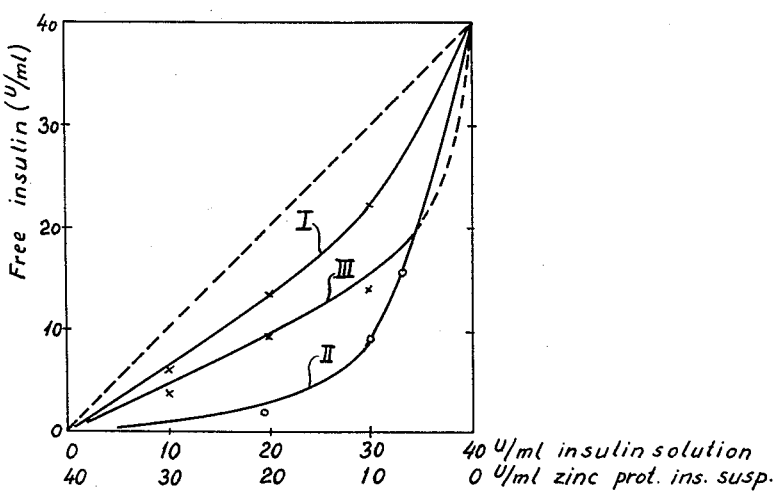

In order to elucidate more detailed the nature of the protamine and zinc mixture and the role of the relative proportions and concentrations, a series of experiments have been carried out. The data of these experiments will be reported below with reference to a series of graphs based thereon and shown in the drawing wherein FIG. 1 shows the dependence of the protamine binding on the zinc added, the amount of remaining free protamine being measured by means of the turbidity which appears in the filtered medium when an extra amount of insulin solution is added thereto, FIG. 2 shows the dependence of the protamine binding on the phosphate concentration, measured as in FIG. 1 but maintaining the amount of zinc added on the value represented by one of the curves of FIG. 1, FIG. 3 shows the interrelationship between the amount of protamine present in a solution and the units of "relative turbidity" as employed in FIG. 1, FIG. 4 shows the ratio of zinc to protamine bound in the crystals, this graph being deducted from FIG. 1 and 2 in combination with FIG. 3 and FIG. 5 shows the insulin concentration in a mixture of an insulin solution and a suspension of crystalline zinc protamine insulin or amorphous zinc protamine insulin as a function of the ratio of mixing.

FIG. 1 is based on the following experiment:

The amounts of zinc, in the form of zinc chloride, indicated at each individual curve of FIG. 1 and the amounts of protamine, as protamine sulphate, indicated along the abscissa are added to a suspension of 40 units of crystalline protamine insulin in a suspension medium which is 1/75 molar with respect to sodium phosphate and pH-value of which is adjusted to 7.3. Thereafter the crystals are filtered off and dissolved insulin is added to the clear filtrate. The resulting turbidity shows nonbound protamine and is indicated in arbitrary units along the ordinate.

The comparatively sharp rise in turbidity occurring in each of the curves when the amount of protamine exceeds a certain value demonstrates that an increase sets in of the amount of protamine present in the suspension medium. This protamine precipitates on addition of insulin.

In a similar way, FIG. 2 shows the turbidity occurring on insulin addition to the suspension media from filtered crystal suspensions formed by varying protamine addition to a suspension of crystalline protamine insulin to which also zinc has been added. The amount of zinc added is constant in this case, viz. 0.075 mg. per ml. of a suspension containing 40 units of insulin (as protamine insulin) per ml., while the varying factor is the phosphate concentrations in the medium, this concentration being 1:37.5 mol, 1:75 mol and 1:150 mol per liter, respectively, as indicated at the three curves.

In the same units as employed in FIGS. 1 and 2, FIG. 3 shows the interrelationship between turbidity and amount of protamine in the solution, also at a pH-value of 7.3. Deducted from this curve three values of free protamine per milliliter are indicated on the axis of ordinates in FIG. 1. By means thereof, it will be seen from FIG. 1 that 0.0025 mg. of free protamine per milliliter of the suspension medium corresponds to an increasing total amount of added protamine per ml. when the amount of zinc increases.

0.0025 mg. of protamine per ml. is a very small amount the presence of which in a preparation exerts no appreciable influence on added and dissolved insulin, only a negligible part thereof being precipitated by such amount of protamine, and this amount practically coincides with the "break point" or change of gradient of the curves of FIG. 1. Consequently, in FIG. 4, the amount of protamine at which the curves intersect a line parallel to the abscissa and having the ordinate 0.0025 mg. of free protamine is considered as the protamine amount bound by the zinc amount in question.

Accordingly, the curve of FIG. 4 shows how many mgs. of protamine are bound by a certain number of mgs. of zinc under the conditions indicated in FIG. 1. Connected values of the amounts of protamine and zinc corresponding to experiments A, B, C and D are given in FIG. 4 as small circles, these experiments having been carried out under the said conditions.

The graph of FIG. 4 may be understood as a curve indicating the amount of protamine which will be bound by a given amount of zinc at a phosphate concentration corresponding to 1:75 molar sodium phosphate, provided an amount of free protamine of 0.0025 mg. per ml., is permitted. It may also be understood as indicating the amount which will be bound at another suitable phosphate concentration, when another limit for the contents of free protamine is set; in this connection it should be kept in mind that the limit of 0.0025 mg. per ml. is arbitrary and low and that a higher limit is very well consistent with the fulfillment of the purpose of the invention. Thus it appears from FIG. 2 that 0.38 mg. of protamine at 0.075 mg. of zinc per ml. brings about a precipitate containing 0.0025 mg. of protamine when the phosphate concentration corresponds to 1:75 molar sodium phosphate; at the double phosphate concentration, however, this amount of protamine and zinc only produces the smaller amount of precipitate corresponding to the turbidity E while at half the said phosphate concentration the said amount of protamine and zinc produces the larger amount of precipitate corresponding to the turbidity F; both of the turbidities E and F are within permissible limits.

Therefore, the graph of FIG. 4 may be read in connection with FIG. 2 and be interpreted as relating to these limits and the corresponding phosphate concentrations.

As will be seen from FIG. 4, the amount of protamine in experiments A, C and D are closely under the maximum value indicated by the curve, this maximum value corresponding to an amount of protamine of approximately five times the amount of zinc, calculated as mgs. per ml. Larger amounts of protamine produces more turbidity when insulin is added, and when the contents of protamine increases the preparations become less satisfactory for admixture with dissolved insulin. In Experiment B the addition of protamine is only about ⅔ of the amount indicated by the curve; as stated above this preparation has been found suitable for admixture with dissolved insulin. By further decrease in the addition of protamine eventually preparations are formed which correspond to preparations consisting of protamine insulin suspensions to which only zinc has been added; the production of such preparations is not encompassed by the present invention.

In FIG. 5, the ordinate represents units of free insulin present in the mixture of the components mixed in the ratio represented along the abscissa.

If no adsorption takes place clearly the contents of free insulin in the mixture would be represented by the dotted line, the concentration of insulin being equal to the amount added.

Since, however, a considerable adsorption takes place in the case of amorphous zinc protamine-insulin the curve II representing the concentration of insulin in this case is much lower than the ideal straight line, the free insulin amounting to practically nothing even when equal amounts of insulin and zinc protamine insulin have been used.

In the case of the curve I representing the concentration of insulin in mixture of insulin and the new crystalline zinc protamine insulin the concentration of insulin is much higher and the curve is much closer to the ideal, dotted line. Comparing for instance the insulin concentrations at a mixture of equal parts of zinc protamine insulin and insulin (20 units of each) the resulting insulin concentration will be seen to be about 15 units or ¾ of the amount added or some 5 times greater than in the case of curve I.

Curves I and II in a certain respect represent conditions simpler than those occurring in practical use. Both of them represent concentrations measured when the insulin solutions and the zinc-protamine insulin suspensions (crystalline or amorphous) mixed have the same pH, which, of course, must be outside the isoelectric zone of insulin. In real practice insulin solutions are only on sale at one pH, viz. 3.3, whereas zinc protamine insulin suspensions must be of higher pH. Thus the insulin solution when added to the suspension will change its pH. This is shown in the curve marked III, the resulting pH values being indicated where observed. Although this curve is not as favourable as curve I it is still much more favourable than curve II.

In the following the invention is further explained with reference to the examples, describing the production of practically usable preparations containing the usual other additions.

Example 1

To 50 mls. of a suspension of protamine insulin crystals containing 80 international units of insulin per ml., 1.5 mgs. of metacresol per ml. and 0.6 mg. of phenol per ml., this suspension being 1/75 molar with respect to sodium phosphate and having a pH-value of 7.3, the following ingredients are added.

(1) 10 mils. of 1/15 molar sodium phosphate solution having a pH-value of 7.5, and (2) 40 mls. of a solution containing:
   7.5 mgs. of zinc dissolved as zinc oxide in a minimum of hydrochloric acid,
   40 mgs. of protamine,
   75 mgs. of metacresol, and
   30 mgs. of phenol.

Example 2

To 50 mls. of a suspension of protamine insulin crystals containing 80 international units of insulin per ml., 1.5 mgs. of metacresol per ml. and 0.6 mg. of phenol per ml., this suspension being 1/75 molar with respect to phosphate and having a pH-value of 7.3, the following is added:

50 mls. of a suspension formed by dissolving 7.5 mgs. of zinc chloride,
40 mgs. of protamine,
75 mgs. of metacresol, and
30 mgs. of phenol in water, adding sodium phosphate to a final concentration of 1/75 gram mol per liter and adjusting the pH-value to 7.3.

Example 3

To 50 mls. of a suspension of protamine insulin crystals containing 80 international units of insulin per ml., 1.5 mgs. of metacresol per ml. and 0.6 mg. of phenol per ml. this suspension being 2/75 molar with respect to phosphate and having a pH-value of 7.5, is added:

50 mls. of a solution containing 7.5 mgs. of zinc,
40 mgs of protamine,
75 mgs. of metacresol, and
30 mgs. of phenol.

Example 4

This example is carried out as Example 3, with the difference that the solution added to the suspension of protamine insulin crystals contains:

4 mgs. of zinc,
20 mgs. of protamine,
75 mgs. of metacresol, and
30 mgs. of phenol.

We claim:
1. Insulin crystals containing protamine and zinc in the amount of 0.25–0.52 mg. of protamine and 0.030–0.085 mg. Zn to 40 units insulin.
2. Insulin crystals according to claim 1 containing between about 3.67 and about 5 parts of protamine to one part of zinc.
3. An insulin preparation consisting of a suspension in a medium containing phosphate buffer of crystals containing protamine and zinc in the amount of 0.25–0.52 mg. protamine and 0.030–0.085 mg. Zn to 40 units insulin.
4. Insulin preparation according to claim 3 in which the ratio of protamine to zinc is between about 3.67 and about 5 parts of protamine to one part of zinc.
5. An insulin preparation according to claim 4 in which the normality of phosphate buffer is between about 0.007 N and about 0.027 N.
6. An insulin preparation according to claim 5 in which the free-protamine content of the suspension medium is below 0.0025 mg. per ml.
7. A method of producing slowly acting insulin preparations in crystalline form, containing insulin, protamine and zinc in which zinc in the form of zinc salt and protamine in the form of protamine salt are added to a suspension of crystals of protamine insulin in the presence of phosphate buffer, the amounts of added zinc and protamine being at least about 0.02 mg. and 0.1 mg., respectively, per ml. of the suspension and the relative amounts of the phosphate and the added zinc and protamine being such that the suspension medium is approximately free of zinc and protamine after the reaction.

References Cited in the file of this patent

UNITED STATES PATENTS 2,179,384 Scott _____ Nov. 7, 1939
2,538,018 Krayenbuhl _____ Jan. 16, 1951
2,849,370 Petersen _____ Aug. 26, 1958

OTHER REFERENCES

U.S. Dispensatory, 24th edition, 1947, Lippincott Co., Phila., Pa., pages 567–570.